United States Patent
Sugiyama

(10) Patent No.: US 10,430,726 B2
(45) Date of Patent: Oct. 1, 2019

(54) MACHINE LEARNING DEVICE THAT LEARNS SHOCKS TO TEACHING DEVICE, SHOCK PREVENTION SYSTEM OF TEACHING DEVICE, AND MACHINE LEARNING METHOD

(71) Applicant: FANUC CORPORATION, Yamanashi (JP)

(72) Inventor: Yuusuke Sugiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/865,920

(22) Filed: Jan. 9, 2018

(65) Prior Publication Data
US 2018/0197112 A1    Jul. 12, 2018

(30) Foreign Application Priority Data
Jan. 10, 2017    (JP) .................................. 2017-001842

(51) Int. Cl.
G06N 20/00    (2019.01)
B25J 9/16    (2006.01)
(Continued)

(52) U.S. Cl.
CPC .............. *G06N 20/00* (2019.01); *B25J 9/163* (2013.01); *G05B 19/406* (2013.01);
(Continued)

(58) Field of Classification Search
CPC ................... B25J 9/163; G05B 19/406; G05B 2219/33098; G05B 2219/33321;
(Continued)

(56) References Cited

U.S. PATENT DOCUMENTS 6,298,283 B1 *  10/2001  Kato ...................... B25J 9/1676
                                                             318/16
2006/0108960 A1 *  5/2006  Tanaka ................... B25J 9/1676
                                                             318/568.21
(Continued)

FOREIGN PATENT DOCUMENTS

JP     11-179688 A    7/1999
JP     2003-11076 A   1/2003
(Continued)

OTHER PUBLICATIONS

Krose et al., "Adaptive state space quantisation for reinforcement learning of collision-free navigation", Jul. 7-10, 1992, Proceedings of the 1992 IEE/RSJ International Conference on Intelligent Robots and Systems, pp. 1327-1332 (Year: 1992).*

*Primary Examiner* — Kamran Afshar
*Assistant Examiner* — Brent Johnston Hoover
(74) *Attorney, Agent, or Firm* — Hauptman Ham, LLP

(57) ABSTRACT

A machine learning device, which learns shocks to a teaching device, includes a state observation unit which observes data based on an inclination of the teaching device or a present position of the teaching device; a label obtaining unit which obtains a label based on a shock received by the teaching device; and a learning unit which generates a learning model based on an output of the state observation unit and an output of the label obtaining unit.

20 Claims, 3 Drawing Sheets

(51) Int. Cl.
  *G05B 19/406* (2006.01)
  *G05B 19/409* (2006.01)
(52) U.S. Cl.
  CPC .. *G05B 19/409* (2013.01); *G05B 2219/33098* (2013.01); *G05B 2219/33321* (2013.01); *G05B 2219/36162* (2013.01); *G05B 2219/39443* (2013.01)
(58) Field of Classification Search
  CPC ........ G05B 19/409; G05B 2219/36162; G05B 2219/39443; G06N 20/00; G06N 99/005
  See application file for complete search history.

(56) References Cited

U.S. PATENT DOCUMENTS

2009/0115846 A1* 5/2009 Ohue .................. B60R 11/04
                                                          348/148
2010/0292838 A1   11/2010 Goswami et al.

FOREIGN PATENT DOCUMENTS

JP    2005-224872 A    8/2005
JP    2007-13546 A     1/2007

* cited by examiner

MACHINE LEARNING DEVICE THAT LEARNS SHOCKS TO TEACHING DEVICE, SHOCK PREVENTION SYSTEM OF TEACHING DEVICE, AND MACHINE LEARNING METHOD

RELATED APPLICATIONS

The present application claims priority to Japanese Application Number 2017-001842, filed Jan. 10, 2017, the disclosure of which is hereby incorporated by reference herein in its entirety.

BACKGROUND OF THE INVENTION

1. Field of the Invention

The present invention relates to a machine learning device that learns shocks to a teaching device, a shock prevention system of a teaching device, and a machine learning method.

2. Description of the Related Art

Conventionally, for example, robots or machine tools controlled by computer numerical control (CNC) devices are taught their motions by means of teaching devices (teach pendants, teaching pendants, TPs) connected to the robot control devices or the CNC devices. Since strong shocks to a teach pendant may result in a malfunction, prediction and prevention of such strong shocks is demanded.

Although systems using teach pendants will not be described in detail herein, the present embodiment is widely applicable to teach pendants (teaching devices) used for giving teachings to various kinds of robots such as industrial robots and collaborative robots or various machine tools and the like controlled by CNC devices as well as to systems using teach pendants.

Conventionally, as a technique of advising the operator of a teaching pendant of danger when an operation of the teaching pendant may lead to a dangerous state, Japanese Laid-Open Patent Publication No. 2003-011076, for example, discloses a teaching pendant wherein keys selectable in a mode are illuminated in a first color while keys are illuminated in a second color when it has been determined that the keys are operable but pressing the keys may lead to danger when pressed on the basis of a result of a comparison between the conditions that may lead to a dangerous state, which are predefined, and the state of the machine controller at the time of the operation of the object to be controlled.

Further, conventionally, as a technique of providing a structure for protecting a pendant housing and the electronic circuit against a drop impact at a low cost, Japanese Laid-Open Patent Publication No. 1999(H11)-179688, for example, discloses a pendant with a protection plate attached to the housing, the protection plate configured in such a form and size as to protrude from the outer circumference of the housing to absorb a drop impact by being deformed or destroyed, wherein a deformed or destroyed protection plate is replaceable independently of the housing.

Further, conventionally, as a robot teaching device enabling an uninterrupted operation of a robot even during the period when the device is broken due to a drop, Japanese Laid-Open Patent Publication No. 2005-224872, for example, discloses a device provided with a teaching device body, a holding unit, a holding unit fixing part, and the like, the holding unit absorbing a drop impact by elastic or plastic deformation thereby allowing the teaching device body to be used uninterruptedly without being affected by the drop impact, a plastically deformed holding unit being easily detachable even during the operation of the robot, wherein the holding unit may be replaced or be repaired to correct the plastic deformation and reattached to the teaching device body.

As described above, various teaching pendants have been conventionally proposed but no teaching pendant proposed so far predicts and prevents a shock thereto. In other words, since teach pendants are used by various operators (users) in a variety of environment, it is considered difficult to predict and prevent a shock (strong shock) to teach pendants.

An object of the present embodiment is to provide a machine learning device capable of predicting and preventing a shock to a teaching device, a shock prevention system of a teaching device, and a machine learning method.

SUMMARY OF INVENTION

According to a first aspect of the present invention, there is provided a machine learning device, which learns shocks to a teaching device, including a state observation unit which observes data based on an inclination of the teaching device or a present position of the teaching device; a label obtaining unit which obtains a label based on a shock received by the teaching device; and a learning unit which generates a learning model based on an output of the state observation unit and an output of the label obtaining unit.

According to a second aspect of the present invention, there is provided a shock prevention system of a teaching device, including the machine learning device according to the above described first aspect; the teaching device, the machine learning device learning shocks to the teaching device; and an output utilization unit which utilizes an output of the machine learning device, wherein the output utilization unit operates in such a manner as to prevent a shock to the teaching device.

According to a third aspect of the present invention, there is provided a machine learning method of learning shocks to a teaching device, including observing state data based on an inclination of the teaching device or a present position of the teaching device; obtaining a label based on a shock received by the teaching device; and generating a learning model based on the observed state data and the label.

BRIEF DESCRIPTION OF THE DRAWINGS

The present invention will be understood more clearly by referring to the following accompanying drawings.

DETAILED DESCRIPTION

Figure 1:
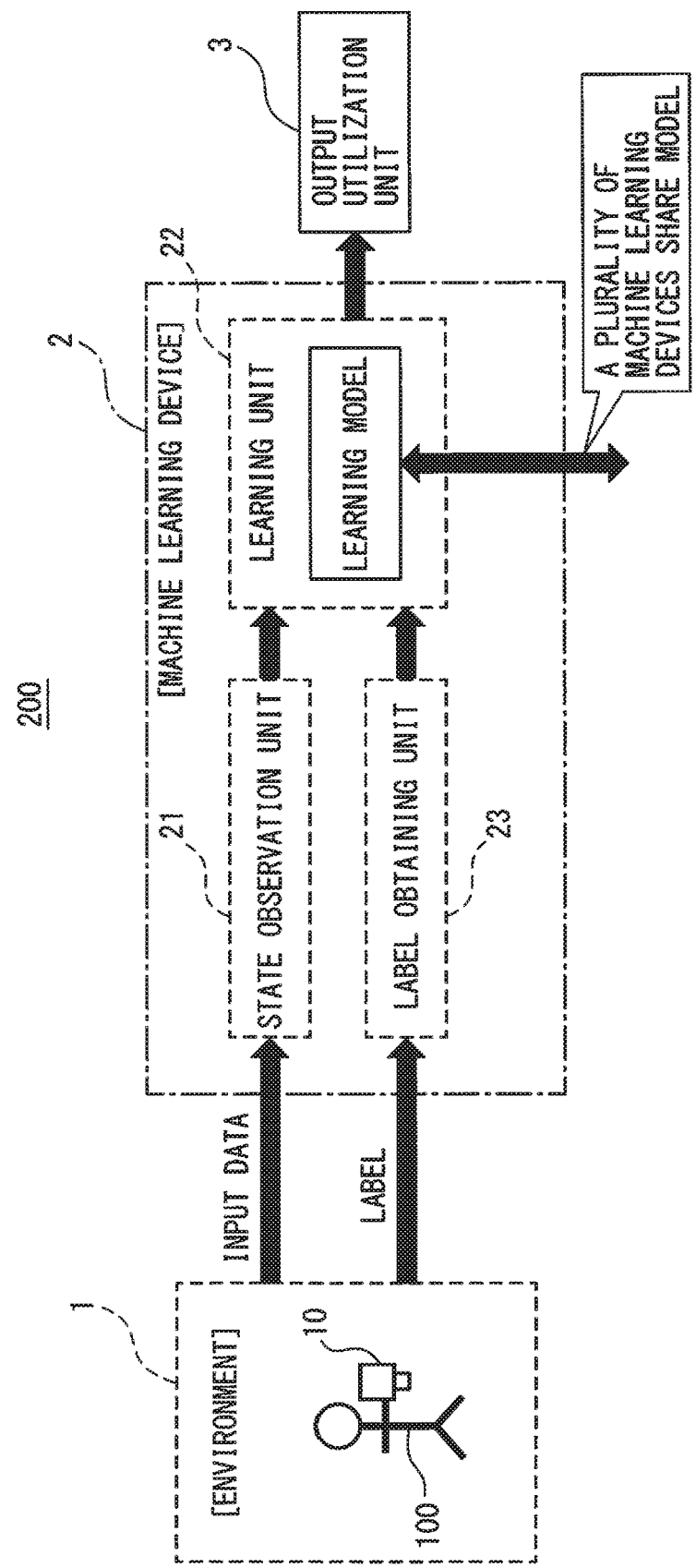
FIG. 1 is a schematic view of a shock prevention system of a teaching device according to the present embodiment.
Figure 2:
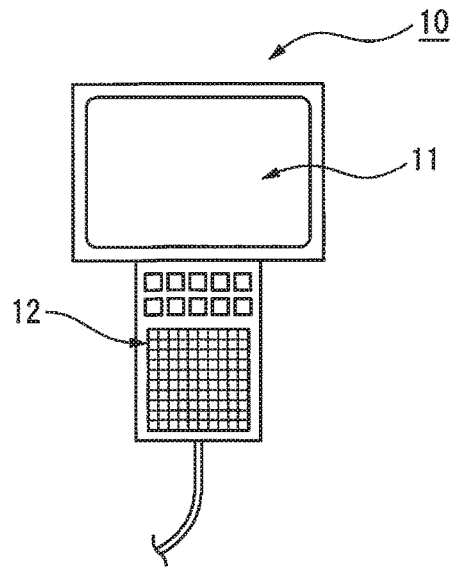
FIG. 2 is a schematic view of an example of the teaching device illustrated in FIG. 1.

Hereinafter, embodiments of a machine learning device, a shock prevention system of a teaching device, and a machine learning method according to the present invention will be described in detail with reference to the attached drawings. FIG. 1 is a schematic view of a shock prevention system of a teaching device according to the present embodiment and FIG. 2 is a schematic view of an example of the teaching device illustrated in FIG. 1.

As illustrated in FIG. 1, the shock prevention system 200 of a teach pendant according to the present embodiment includes a machine learning device 2 and an output utilization unit 3. The machine learning device 2 includes a state observation unit 21, a learning unit 22, and a label obtaining unit 23; and the environment 1 includes a teach pendant (teaching device) 10 and an operator 100. As illustrated in FIG. 2, the teach pendant 10 includes a display unit (display) 11 and buttons (operation keys) 12. It is needless to say that the teach pendant 10 may include various other components such as a speaker for advising caution by voice or a lamp or a buzzer for outputting an alarm in light or sound.

The machine learning device 2 may be provided, for example, in a robot control device (not illustrated) to control a robot, in a CNC device (not illustrated) to control a machine tool, or in the teach pendant 10. A plurality of robots or machine tools may be provided with machine learning devices 2 placed, for example, on a cloud server or a fog server and connected via a network (for example, the Internet or Ethernet (registered trademark)).

The state observation unit 21 observes, for example, data including at least one of the inclination of the teach pendant 10, the present position of the teach pendant 10, the speed at which the buttons of the teach pendant 10 are pressed, (the intervals at which the buttons are pressed), the content of the operation for which the teach pendant 10 is used, the length of time of the operation, the time zone of the operation, and the identity of the operator 100 who handles the teach pendant 10 as input data (state data or state variable) given by the environment 1.

The label obtaining unit 23 obtains a label based on whether or not a shock received by the teach pendant 10 is greater than a certain threshold value. The learning unit 22 generates a learning model based on an output (state data) of the state observation unit 21 and an output (label) of the label obtaining unit 23.

The inclination of the teach pendant 10 may be obtained, for example, from an acceleration sensor or an inclination sensor provided for the teach pendant 10; and the present position of the teach pendant 10 may be obtained, for example, from a camera or an area sensor provided above the operation area in which the teach pendant 10 is used. The speed at which the buttons of the teach pendant 10 are pressed may be obtained from the teach pendant 10, the robot control device, or the like; and the content of the operation for which the teach pendant 10 is used, the length of time of the operation, and the time zone of the operation may be obtained from the program or the clock function of the robot control device or the like.

The identity of the operator 100 who handles the teach pendant 10 may be obtained, for example, from IDs and the like inputted by the operators using the robot control device or the like. The shock received by the teach pendant 10 is obtained, for example, from an acceleration sensor provided for the teach pendant 10.

In other words, the state observation unit 21 observes as state data not only the inclination of the teach pendant 10 and the present position of the teach pendant 10 but also, for example, the speed at which the buttons of the teach pendant 10 are pressed, which is related to whether or not the operator 100 is in haste (for example, when the operator 100 is in haste, a mistake such as dropping the teach pendant 10 is more likely to happen) or the content of the operation, which is related to whether the operation is conducted immediately after the teach pendant is powered ON or conducted as a first operation (for example, when the operator 100 conducts a first operation, a mistake is more likely to happen) and to the teaching operation (for example, complicated teaching operations are more likely to lead to a mistake).

Further, the state observation unit 21 observes as state data, for example, the length of time of the operation, which is related to whether or not the operation is conducted for a long time (for example, when the operation is conducted for a long period of time, the operator 100 is more likely to lose concentration and make a mistake), the time zone of the operation, which is related to the time zone in which the operator 100 conducts operation (for example, the operator 100 is more likely to feel sleepy and make a mistake after lunch) or the identity of the operator, which is related to individual operators 100 (for example, a particular operator 100 handles the teach pendant 10 roughly and is more likely to make a mistake). Note that the afore-mentioned state data that the state observation unit 21 observes has been given merely as an example and it is needless to say that various other data of the environment 1 may be observed.

The output utilization unit 3 receives an output of the machine learning device 2 (a learning model updated by the learning model update unit 222) and operates in such a manner as to prevent a shock to the teach pendant 10. In other words, on the basis of the output of the machine learning device 2, the output utilization unit 3 advises caution or outputs an alarm in advance when, for example, the teach pendant 10 is expected to be dropped and receive a great shock.

More specifically, the output utilization unit 3 advises the operator 100 to take caution by outputting from the speaker provided for the teach pendant 10 a voice saying "Expecting a shock. Be alert." or outputs an alarm (caution advice) to the operator 100 by causing a lamp provided for the teach pendant 10 to turn on or blink, by activating a buzzer provided for the teach pendant 10, by playing a melody from the speaker, or by other means. Further, for example, the output utilization unit 3 causes a display 11 of the teach pendant 10 to display words of caution or causes the teach pendant 10 to vibrate to advise the operator 100 to take caution. Note that caution advice and alarm outputs are not limited to those issued by the teach pendant 10 itself and, needless to say, may be given by a robot, a machine tool, or a robot control device or a CNC device, or various means provided in the periphery of a robot or a machine tool.

This enables the operator 100 to be aware of the situation in which the teach pendant 10 is likely to receive a strong shock before the teach pendant 10 actually receives a strong shock, and to prevent (avert) a strong shock to the teach pendant 10. In other words, it becomes possible to predict and prevent a shock to the teach pendant (teaching device).

As described above, a plurality of machine learning devices 2 may be provided on a cloud server or a fog server via a network (telecommunication medium) and may be configured to mutually share or exchange data via telecommunication medium. In other words, a machine learning device 2 may be communicable to at least one other machine learning device to mutually exchange or share a learning model generated by the learning unit 22 of the machine learning device 2 with the at least one other machine learning device.

Figure 3:
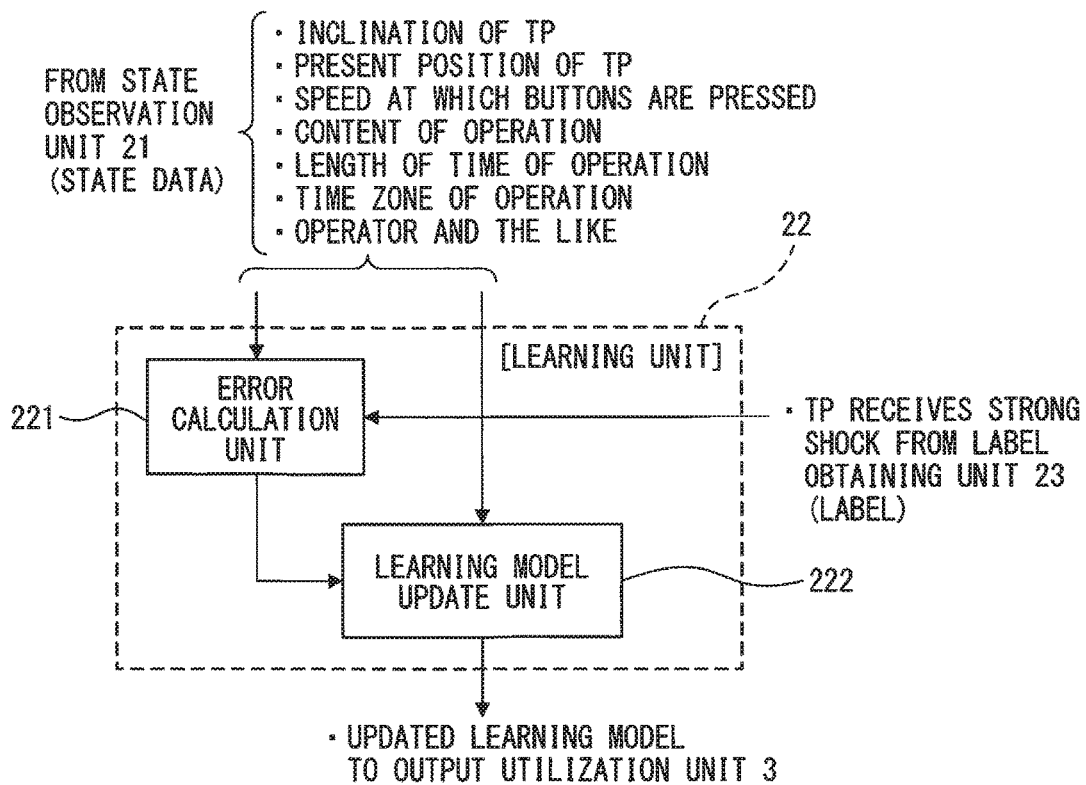
FIG. 3 is a block diagram illustrating an example of the learning unit of the machine learning device illustrated in FIG. 1.

FIG. 3 is a block diagram illustrating an example of the learning unit of the machine learning device illustrated in FIG. 1. As illustrated in FIG. 3, the learning unit 22 includes an error calculation unit 221 and a learning model update unit 222. The error calculation unit 221 receives state data from the state observation unit 21 (the inclination of the teach pendant 10, the present position of the teach pendant 10, the speed at which the buttons of the teach pendant 10 are pressed, the content of the operation, the length of time of the operation, the time zone of the operation, the identity of the operator, and the like) as well as a label from the label obtaining unit 23 (indicating that the teach pendant 10 received a strong shock) and calculates the error. The learning model update unit 222 receives state data from the state observation unit 21 and an output from the error calculation unit and updates a learning model for determining the error in the shock to the teach pendant 10. The learning model update unit 222 outputs its outputs (an updated learning model) to the above-described output utilization unit 3.

In the above, the machine learning device 2 may be implemented by using, for example, a neural network. The machine learning device 2 may be practically implemented by a general purpose computer or processor but, for example, general-purpose computing on graphics processing units (GPGPU), a large-scale PC cluster, or the like may be employed for processing at an even higher speed.

Figure 4:
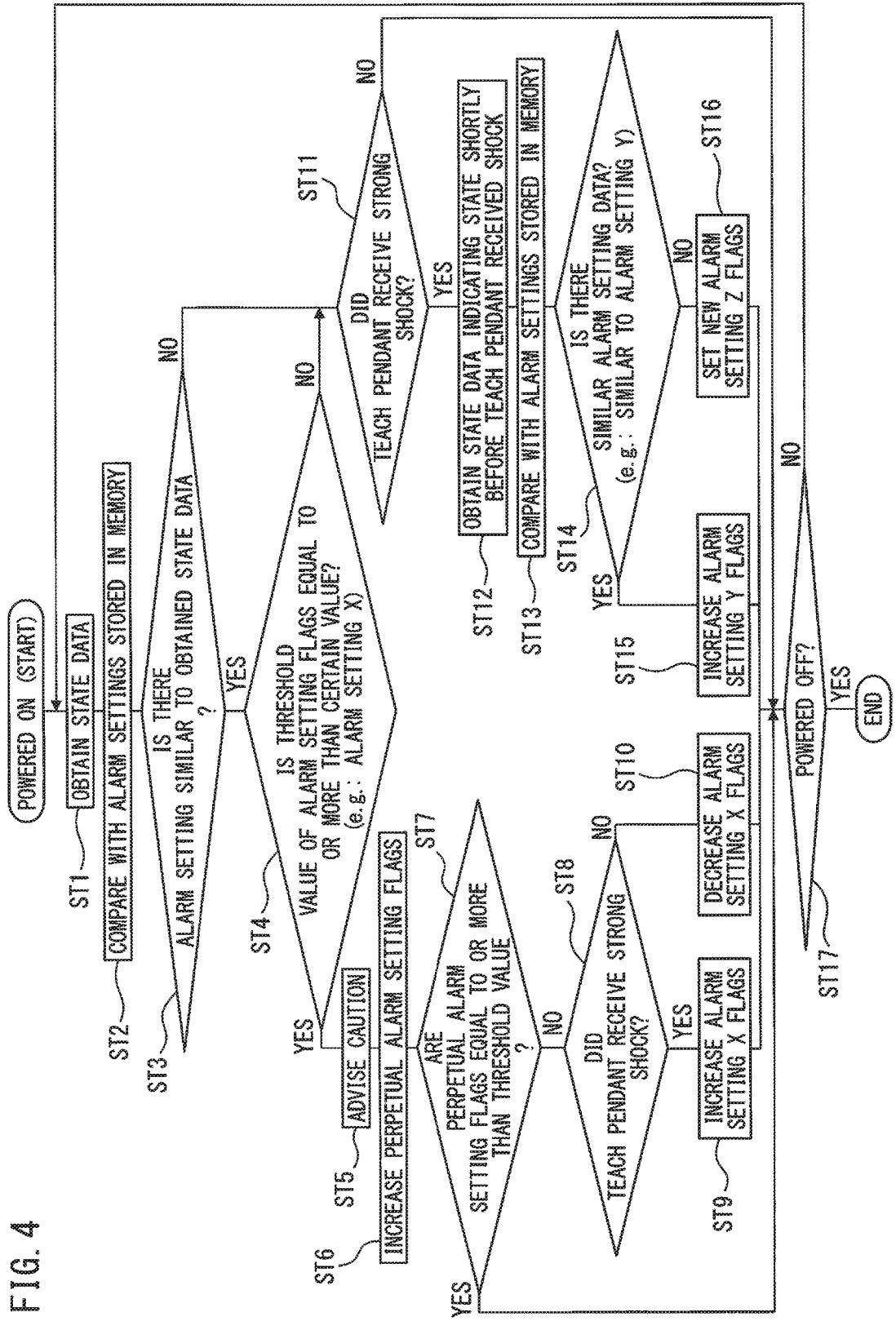
FIG. 4 is a flow chart for describing an example of the processing applied to the machine learning device illustrated in FIG. 1.

FIG. 4 is a flow chart for describing an example of the processing applied to the machine learning device illustrated in FIG. 1. As illustrated in FIG. 4, when a shock prevention system 200 of a teaching device (teaching device 10) is powered ON and machine learning is started (start of the learning), the state observation unit 21 obtains state data in Step ST1 and the process proceeds to Step ST2. As described above, the state data (input data) includes, for example, the inclination of the teach pendant (teaching device) 10, the present position of the teach pendant 10, the speed at which the buttons of the teach pendant 10 are pressed (the intervals at which the buttons are pressed), the content of the operation for which the teach pendant 10 is used, the length of time of the operation, the time zone of the operation, and the identity of the operator 100 who handles the teach pendant 10.

The obtained state data is compared with the alarm settings stored in memory in Step ST2 and it is determined in Step ST3 whether or not there is an alarm setting similar (comparable) to the obtained state data. In Step ST3, when it has been determined that there is an alarm setting similar to the obtained state data (YES), the processing proceeds to Step ST4 and, when it has been determined that there is no alarm setting similar to the obtained state data (NO), the processing proceeds to Step ST11.

In Step ST4, it is determined whether or not the threshold value of the alarm setting flag is equal to or more than a certain value, for example, whether or not the threshold value of the alarm setting X flags is equal to or more than a certain value. When it has been determined in Step ST4 that the threshold value of the alarm setting X flags is equal to or more than a certain value (YES), caution is advised (an alarm is outputted) in Step ST5 and the processing further proceeds to Step ST6. To advise caution in Step ST5, for example, at least one of an alarm using light (turning on or blinking a lamp) or sound (a buzz or a melody), voice, indication on a display, vibration, and the like may be used to prevent (avert) a strong shock to the teach pendant 10. When it has been determined in Step ST4 that the threshold value of the alarm setting X flags is not equal to or more than a certain value (NO), the processing proceeds to Step ST11.

In Step ST6, perpetual alarm setting flags are increased and it is determined in Step ST7 whether or not the perpetual alarm setting flags are equal to or more than a threshold value. The perpetual alarm setting flags are increased, on the basis of a result of the machine learning, with respect to a perpetual, not temporary, alarm indicating that, for example, the teach pendant 10 is frequently dropped in a certain circumstance.

When it has been determined Step ST7 that the perpetual alarm setting flags are not equal to or more than the threshold value (NO), it is determined in Step ST8 whether or not the teach pendant 10 received a strong shock. When it has been determined in Step ST7 that the perpetual alarm setting flags are equal to or more than the threshold value (YES), it is determined in Step ST17 whether or not the teaching device 10 (shock prevention system 200) is powered OFF.

When it has been determined in Step ST8 that the teach pendant 10 received a strong shock (YES), the processing proceeds to Step ST9 and, for example, the alarm setting X flags are increased and when it has been determined that the teach pendant 10 did not receive a strong shock (NO), the processing proceeds to Step ST10 and, for example, the alarm setting X flags are decreased. After the processing in Steps ST9 and ST10 is completed, it is determined in Step ST17 whether or not the teaching device 10 is powered OFF.

When it has been determined in Step ST3 that there is no alarm setting similar to the obtained state data (NO) or it has been determined in Step ST4 that the threshold value of the alarm setting X flags is not equal to or more than a certain value (NO), the processing proceeds to Step ST11 and it is determined in Step ST11 whether or not the teach pendant 10 received a shock. When it has been determined in Step ST11 that the teach pendant 10 received a strong shock (YES), the processing proceeds to Step ST12, in which state data indicating a state shortly before the teach pendant 10 received the shock is obtained, and then to Step ST13. In Step ST13, the state data indicating a state shortly before the teach pendant 10 received the shock, which is obtained in Step ST12, is compared with the alarm settings (setting data corresponding to the cases of outputting an alarm) stored in memory and the processing proceeds to Step ST14.

In Step ST14, it is determined whether or not there is similar alarm setting data (for example, it is determined whether or not the obtained state data is similar to the alarm setting Y) and when it has been determined that the obtained state data is similar to the alarm setting Y (YES), the alarm setting Y flags are increased in Step ST15, and when it has been determined that the obtained state data is not similar to the alarm setting Y (NO), new alarm setting Z flags are set in Step ST16. After the processing in Steps ST15 and ST16 is completed, it is determined in Step ST17 whether or not the teaching device 10 is powered OFF. When it has been determined in Step ST11 that the teach pendant 10 did not receive a strong shock (NO), it is determined in Step ST17 whether or not the teaching device 10 is powered OFF.

When it has been determined in Step ST17 that the teaching device 10 (shock prevention system) is not powered OFF (NO), the processing returns to Step ST1 to repeat the same process and, when it has been determined that the teaching device 10 is powered OFF (YES), the processing terminates.

As described above, according to the present embodiment, the state observation unit 21 observes as state data the data indicating a state immediately before the teach pendant 10 receives a strong shock and the machine learning is performed as described with reference to FIG. 1 to FIG. 3, which enables the prediction and prevention of a shock to the teach pendant (teaching device). The present embodiment is widely applicable to teaching devices for giving teaching to various kinds of robots such as industrial robots and collaborative robots, or various machine tools and the like controlled by CNC devices as well as to systems using teaching devices.

The machine learning device, the shock prevention system of the teaching device, and the machine learning method according to the present embodiments have advantageous effects of predicting and preventing a shock to a teaching device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device, which learns shocks to a teaching device, comprising:
   a state observation unit which observes data based on an inclination of the teaching device or a present position of the teaching device;
   a label obtaining unit which obtains a label based on a shock received by the teaching device; and
   a learning unit which generates a learning model based on an output of the state observation unit and an output of the label obtaining unit.

2. The machine learning device according to claim 1, wherein
   the state observation unit further observes data based on at least one of speed at which buttons of the teaching device are pressed, content of an operation involving the teaching device, length of time of the operation, a time zone of the operation, and an identity of an operator of the teaching device.

3. The machine learning device according to claim 1, wherein
   the label obtaining unit obtains a label based on whether or not the shock received by the teaching device is greater than a threshold value.

4. The machine learning device according to claim 1, wherein
   the learning unit comprises: an error calculation unit which calculates an error based on outputs of the state observation unit and the label obtaining unit; and
   a learning model update unit which updates a learning model for determining an error in a shock to the teaching device, based on outputs of the state observation unit and the error calculation unit.

5. The machine learning device according to claim 1, wherein
   the machine learning device comprises a neural network.

6. The machine learning device according to claim 1, wherein
   the machine learning device is connectable with at least one other machine learning device and exchanges or shares with the at least one other machine learning device a learning model generated by the learning unit of the machine learning device.

7. The machine learning device according to claim 1, comprising a processor configured as the state observation unit, the label obtaining unit and the learning unit.

8. The machine learning device according to claim 7, wherein
   the teaching device comprises an acceleration sensor or an inclination sensor configured to detect the inclination of the teaching device,
   the processor is configured to observe the data based on the inclination of the teaching device obtained from the acceleration sensor or the inclination sensor of the teaching device, and
   the processor is further configured to observe the data based on the speed at which the buttons of the teaching device are pressed.

9. The machine learning device according to claim 7, wherein
   in response to the label indicating that the shock received by the teaching device is stronger than a threshold value, the processor is configured to
      obtain first data observed in a time period before the teaching device receives the shock stronger than the threshold value,
      compare the obtained first data with an alarm setting corresponding to a case where the output utilization unit outputs an alarm,
      in response to the obtained first data being similar to the alarm setting, increase the alarm setting, and
      in response to the obtained first data being not similar to the alarm setting, set a new alarm setting.

10. A shock prevention system of a teaching device, comprising:
    the machine learning device according to claim 1;
    the teaching device, the machine learning device learning shocks to the teaching device; and
    an output utilization unit which utilizes an output of the machine learning device, wherein the output utilization unit operates in such a manner as to prevent a shock to the teaching device.

11. The shock prevention system of the teaching device according to claim 10, wherein
    the output utilization unit outputs an alarm or advises caution before the teaching device receives a shock, based on an output of the machine learning device, to prevent the shock to the teaching device.

12. The shock prevention system of the teaching device according to claim 11, wherein
    the output utilization unit uses at least one of an alarm using light or sound, voice, indication on a display, and vibration before the teaching device receives a strong shock greater than a certain threshold value to prevent the strong shock to the teaching device.

13. The shock prevention system according to claim 10, wherein
    the machine learning device comprises a processor configured as the state observation unit, the label obtaining unit and the learning unit.

14. The shock prevention system according to claim 13, wherein
    the teaching device comprises an acceleration sensor or an inclination sensor configured to detect the inclination of the teaching device, and
    the processor is configured to observe the data based on the inclination of the teaching device obtained from the acceleration sensor or the inclination sensor of the teaching device.

15. The shock prevention system according to claim 14, wherein the processor is further configured to observe the data based on the speed at which the buttons of the teaching device are pressed.

16. The shock prevention system according to claim 13, wherein
in response to the label indicating that the shock received by the teaching device is stronger than a threshold value, the processor is configured to
obtain first data observed in a time period before the teaching device receives the shock stronger than the threshold value,
compare the obtained first data with an alarm setting corresponding to a case where the output utilization unit outputs an alarm,
in response to the obtained first data being similar to the alarm setting, increase the alarm setting, and
in response to the obtained first data being not similar to the alarm setting, set a new alarm setting.

17. A machine learning method of learning shocks to a teaching device, comprising:
observing state data based on an inclination of the teaching device or a present position of the teaching device;
obtaining a label based on a shock received by the teaching device; and
generating a learning model based on the observed state data and the label.

18. The machine learning method according to claim 17, wherein
the state data further comprises data based on at least one of speed at which buttons of the teaching device are pressed, content of an operation involving the teaching device, length of time of the operation, a time zone of the operation, and an identity of an operator of the teaching device.

19. The machine learning method according to claim 17, wherein
the label is based on whether or not the shock received by the teaching device is greater than a threshold value.

20. The machine learning method according to claim 17, wherein
the generating the learning model comprises:
calculating an error based on the observed state data and the label; and
updating a learning model for determining an error in a shock to the teaching device, based on the state data and the calculated error.

\* \* \* \* \*